(12) United States Patent
Wilpsbaeumer et al.

(10) Patent No.: US 7,718,297 B2
(45) Date of Patent: May 18, 2010

(54) FUEL CELL SYSTEM HAVING WATER-RETAINING MATERIAL

(75) Inventors: Reiner Wilpsbaeumer, Wiesbaden (DE); Detlef Guenther, Mainz-Kastel (DE); Remy Fontaine, Wiesbaden (DE); Dirk Wexel, Mainz (DE)

(73) Assignee: GM Global Technology Operations, Inc., Detroit, MI (US)

( * ) Notice: Subject to any disclaimer, the term of this patent is extended or adjusted under 35 U.S.C. 154(b) by 708 days.

(21) Appl. No.: 11/557,561

(22) Filed: Nov. 8, 2006

(65) Prior Publication Data

US 2008/0107929 A1    May 8, 2008

(51) Int. Cl.
*H01M 2/00* (2006.01)
*H01M 2/02* (2006.01)

(52) U.S. Cl. ............................................... 429/34
(58) Field of Classification Search .................. 429/34
See application file for complete search history.

(56) References Cited

U.S. PATENT DOCUMENTS

2003/0012993 A1 *   1/2003   Katagiri et al. ............... 429/26

\* cited by examiner

*Primary Examiner*—Patrick Ryan
*Assistant Examiner*—Ashley Kwon

(57) ABSTRACT

A product comprising a fuel cell stack comprising a cathode outlet, a first conduit connected to the cathode outlet and to a first housing, a water-retaining material provided in said first housing, a bypass conduit connected to the cathode outlet of the fuel cell system, and a first valve for opening and closing at least one of said first conduit and said bypass conduit.

20 Claims, 5 Drawing Sheets

FUEL CELL SYSTEM HAVING WATER-RETAINING MATERIAL

TECHNICAL FIELD

The disclosure relates to fuel cell systems having a water-retaining material.

BACKGROUND OF THE INVENTION

In a polymer-electrolyte-membrane (PEM) fuel cell, a polymer membrane serves as the electrolyte between a cathode and an anode. The polymer membrane currently being used in fuel cell applications requires a certain level of humidity to facilitate conductivity of the membrane. Therefore, maintaining the proper level of humidity in the membrane, through humidity/water management, is very important for the proper functioning of the fuel cell.

During the conversion of hydrogen and oxygen (air) to electricity in the fuel cell, water is produced as a reaction by-product. The product water is removed from the fuel cell by a cathode exhaust conduit. Due to the moist operation conditions of the fuel cell, the operating parameters are chosen in such a manner that certain water saturation is reached at the cathode exhaust outlet.

SUMMARY OF EXEMPLARY EMBODIMENTS OF THE INVENTION

One embodiment of the invention includes a product comprising a fuel cell stack comprising a cathode outlet, a first conduit connected to the cathode outlet and to a first housing. A water-retaining material is provided in said first housing. A bypass conduit is connected to the cathode outlet of the fuel cell system, and a first valve for opening and closing at least one of said first conduit and said bypass conduit.

BRIEF DESCRIPTION OF THE DRAWINGS

The following is a brief description of the drawings.

DETAILED DESCRIPTION OF EXEMPLARY EMBODIMENTS OF THE INVENTION

Figure 1A:
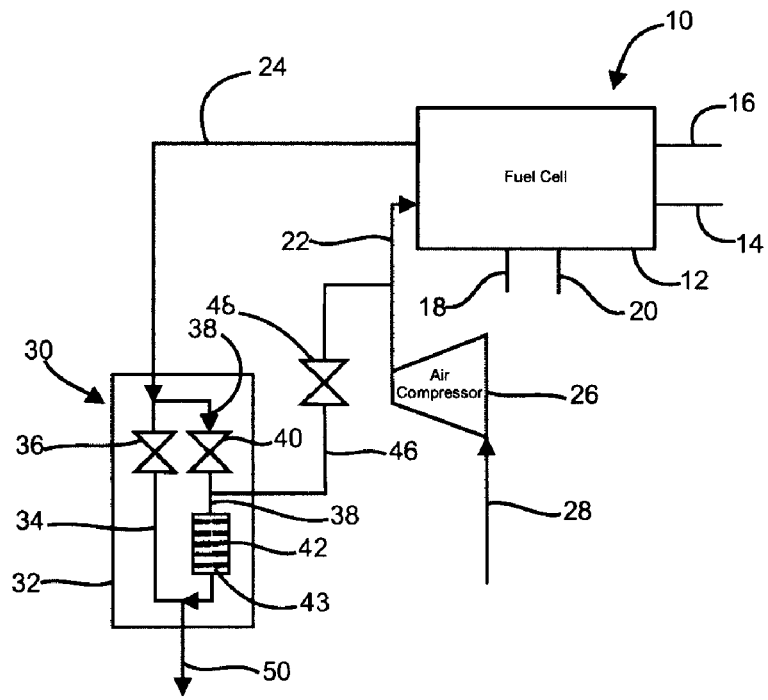
FIG. 1A is a schematic of a fuel cell system illustrating operation of the water-retaining system upon fuel cell start-up or under cold ambient temperatures according to one embodiment of the invention.
Figure 1B:
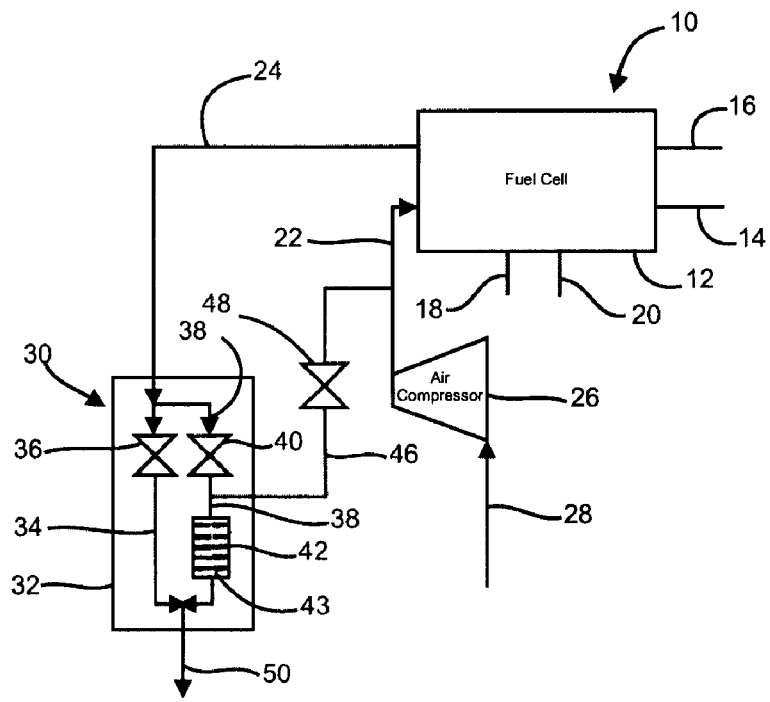
FIG. 1B is a schematic of the system of FIG. 1A, illustrating operation of the water-retaining system under warm ambient temperatures according to one embodiment of the invention.
Figure 1C:
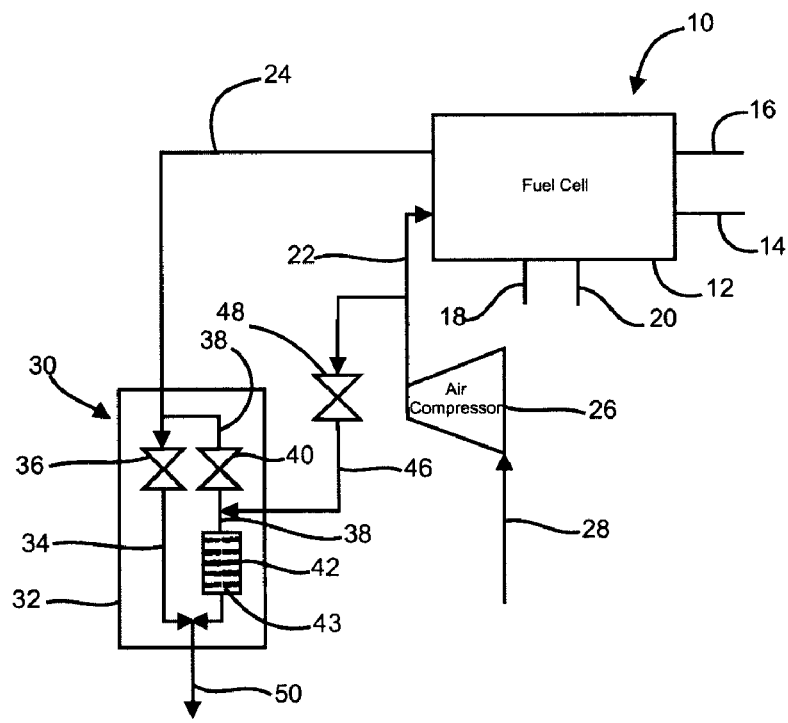
FIG. 1C is a schematic of the system of FIG. 1A, illustrating regeneration of water-retaining material according to one embodiment of the invention.

Referring to FIGS. 1A-1C, one embodiment of the invention includes a water-retaining system generally indicated by reference numeral 30. The water-retaining system 30, the details of which will be hereinafter described, is part of a fuel cell system 10. The fuel cell system 10 includes a fuel cell stack 12 including a plurality of fuel cells. The stack 12 having an anode inlet 14 for distributing an anode gas such as hydrogen into the fuel cell 12 and an anode outlet 16 for distributing excess anode gas from the fuel cell 12. A cathode inlet 22 is connected to the fuel cell 12 for providing an oxidant such as air. In one embodiment, an air compressor 26 having an air inlet 28 is connected to the cathode inlet 22. The air compressor 26 forces ambient air into the fuel cell 12 through the cathode inlet 22, and a cathode outlet 24 delivers exhaust (excess air and by-product water) from the fuel cell 12. A coolant inlet 18 may be provided to deliver a coolant liquid into the fuel cell 12, and a coolant outlet 20 provided to deliver the coolant liquid from the fuel cell 12, as is known by those skilled in the art.

In one embodiment of the invention, the water-retaining system 30 may include a first system housing 32, which is connected to the cathode outlet 24. A bypass conduit 34 and a first conduit 38 in the first system housing 32 branch or diverge from the cathode outlet conduit 24. Valves 36, 40 are provided at the inlet ends of the bypass conduit 34 and first conduit 38, respectively. Each of the valves 36, 40 may be any type known to those skilled in the art, including a flap, ball, piston or gate valve which is capable of regulating the flow of air and may be controlled mechanically or in response to a controller (not shown), for example. A water-retaining material housing 42 is provided in the first conduit 38 for flowing cathode exhaust though the housing 42. A water-retaining material 43 is provided in the housing 42. The water-retaining material 43 may be a particulate absorbent or adsorbent material, or alternatively, may be an absorbent or adsorbent material, which adheres to the interior surfaces of the housing 42. One suitable material for the water-retaining material 43 is silicagel. In various other embodiments, the water-retaining material 43 may include a zeolite, molecular sieves, calcium bentonite, calcium chloride, aluminum oxide or absorbent polymers, particularly super absorber materials such as a modified polyacylate. The interior of the housing may also be filled with a non-corrosive sheet metal in several layers or made for a mesh of layers, providing a large surface area where water is collected. At the discharge ends, the bypass conduit 34 and the first conduit 38 converge into a discharge conduit 50, which extends from the first system housing 32.

A regeneration inlet conduit 46 establishes air communication between the cathode inlet 22 and the first conduit 38 of the system 30, downstream of the valve 40. A regeneration valve 48 is provided in the regeneration inlet conduit 46, in the downstream direction of air flow from the air compressor 26.

Figures 4, 5:
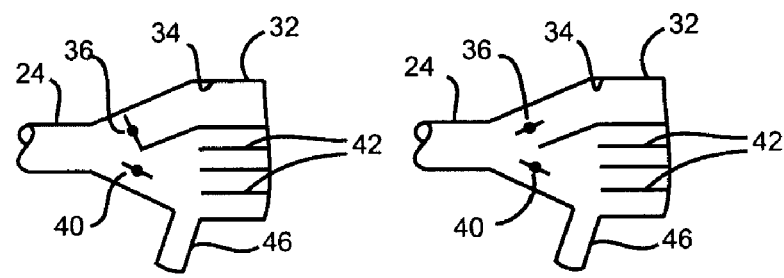
FIG. 4 is a sectional view of the system of FIG. 3, illustrating closing of the bypass conduit and opening of the first conduit for flow of moisture-laden exhaust air therethrough during start-up of a fuel cell or under cold ambient temperatures according to one embodiment of the invention.
FIG. 5 is a sectional view of the system of FIG. 3, illustrating opening of the bypass conduit and first conduit under warm ambient temperatures according to one embodiment of the invention.
Figure 6:
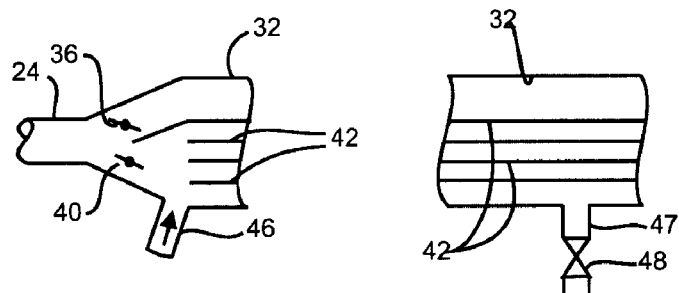
FIG. 6 is an enlarged sectional view of the system of FIG. 3, illustrating partial opening of the bypass conduit and first conduit, and delivery of air through a regeneration inlet conduit during regeneration of the water-retaining material according to one embodiment of the invention.

Referring again to FIGS. 1A-1C and to FIGS. 4-6, in one embodiment of the invention, hydrogen gas (not shown) is delivered into the fuel cell 12 through the anode inlet 14. Simultaneously, the air compressor 26 forces ambient air from the air inlet 28 and into the fuel cell 12 through the cathode inlet 22. In the fuel cell 12, electrons are generated from the hydrogen gas at an anode (not shown) and delivered as electric current through an electric motor or other work-related device (not shown). Protons are passed from the anode, through a Polymer electrolyte membrane (not shown) to a cathode (not shown), where the protons combine with oxygen from the air entering the fuel cell 10 through the cathode inlet 22 and with the electrons returning from the work-related device to form water as a by-product. The water is delivered with excess air as exhaust from the fuel cell 12 through the cathode outlet 24.

In one embodiment of the invention, the cathode outlet 24 delivers the exhaust from the fuel cell 12 to the water-retaining system 30. Depending on whether the fuel cell 12 is in a start-up mode or the ambient temperature is cold or warm, the exhaust is delivered either through the first conduit 38 and housing 42 only or through both the bypass conduit 34 and the first conduit 38 and housing 42. FIGS. 1A and 4 illustrate flow of the exhaust through the water-retaining system 30 upon start-up of the fuel cell 12 and/or under cold ambient temperatures according to one embodiment of the invention. Under such conditions, the water in the exhaust tends to condense in the cathode outlet 24, thus rendering necessary removal of most of the water from the exhaust prior to discharge of the exhaust from the discharge conduit 50. Accordingly, the valve 36 is closed and the valve 40 is opened, as shown in FIG. 4, and the regeneration valve 48 remains in the closed position. Therefore, substantially all of the initially moisture-laden exhaust from the cathode outlet 24 flows through the first conduit 38 and housing 42, respectively, where the exhaust is dried and then discharged to the atmosphere through the discharge conduit 50.

As it passes through the housing 42, the exhaust flows through or is directed against the water-retaining material 43. Therefore, the water-retaining material 43 either absorbs the excess moisture or the moisture is adsorbed onto the surface of the water-retaining material 43, depending on the type of material used. Consequently, the exhaust, which emerges from the housing 42 and is then discharged from the discharge conduit 50, has a relative humidity, which is substantially lower than that of the exhaust flowing through the cathode outlet 24.

FIGS. 1B and 5 illustrate flow of the exhaust through the water-retaining system 30 under non-startup and warm ambient temperature conditions according to various embodiments of the invention. Under such conditions, most of the water in the exhaust tends to remain in the vapor phase in the cathode outlet 24. This renders necessary removal of only a portion of the water from the exhaust prior to discharge of the exhaust from the discharge conduit 50. Accordingly, both the valve 36 and the valve 40 are opened while the regeneration valve 48 remains in the closed position. In one embodiment of the invention, substantially equal quantities of the exhaust from the cathode outlet 24 flow through the bypass conduit 34 and the first conduit 38 and absorber conduit 42, respectively.

The exhaust from the bypass conduit 34 and the exhaust from the absorber conduit 42 join in the discharge conduit 50 and are discharged together into the atmosphere.

The portion of the exhaust, which passes through the absorber conduit 42, is directed against or through the water-retaining material 43. Therefore, depending on the type of material used for the water-retaining material 43, the excess moisture is either absorbed by or adsorbed onto the water-retaining material 43. The exhaust air of reduced moisture, which emerges from the absorber conduit 42, enters the discharge conduit 50 and mixes with the exhaust of higher moisture content from the bypass conduit 34. Consequently, the exhaust, which is discharged from the discharge conduit 50, has a relative humidity, which is somewhat lower than that of the exhaust flowing through the cathode outlet 24.

Throughout prolonged operation of the absorber system 30, the water-retaining material 43 in the housing 42 gradually becomes saturated, and therefore, requires regeneration. FIGS. 1C and 6 illustrate operation of the water-retaining system 30 to regenerate the water-retaining material 43. Accordingly, when the fuel cell system 10 is warm and operating conditions of the fuel cell system 10 allow, the water-retaining material 43 is regenerated. This is carried out by partially opening the valve 36 and the valve 40, as shown in FIG. 6. Consequently, substantially equal quantities of the exhaust from the cathode outlet 24 flow through the bypass conduit 34 and the first conduit 38 and housing 42, respectively. Simultaneously, the regeneration valve 48 is opened. This allows hot and/or dry air to flow from the cathode inlet 22 and through the regeneration inlet conduit 46, the first conduit 38 and the housing 42, respectively. In the housing 42, the dry air removes moisture from the water-retaining material 43 and is then discharged to the atmosphere through the discharge conduit 50. Accordingly, the water-retaining material 43 in the housing 42 is primed for continued use.

Figure 2A:
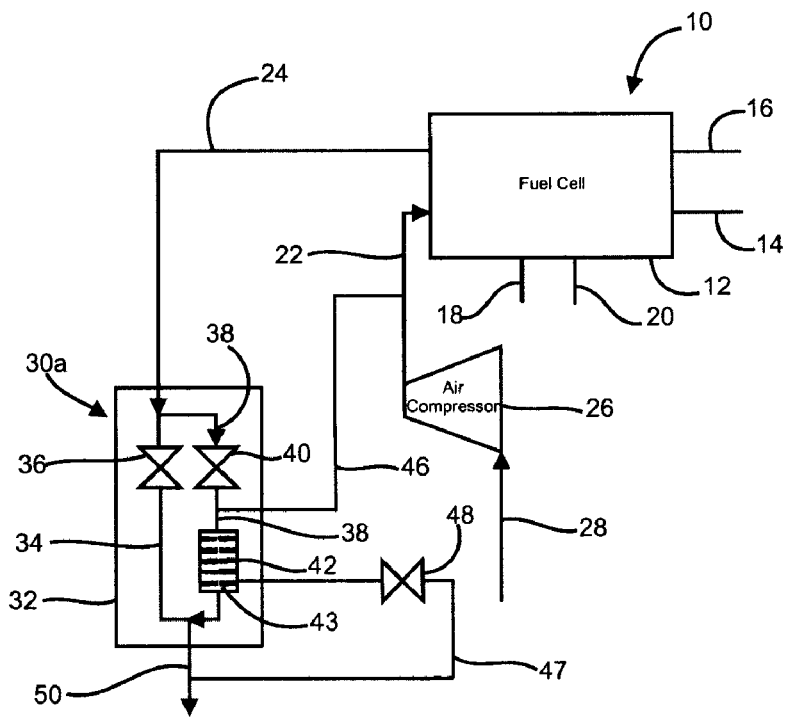
FIG. 2A is a schematic of a fuel cell system illustrating operation of the water-retaining system upon fuel cell start-up or under cold ambient temperatures according to one embodiment of the invention.
Figure 2B:
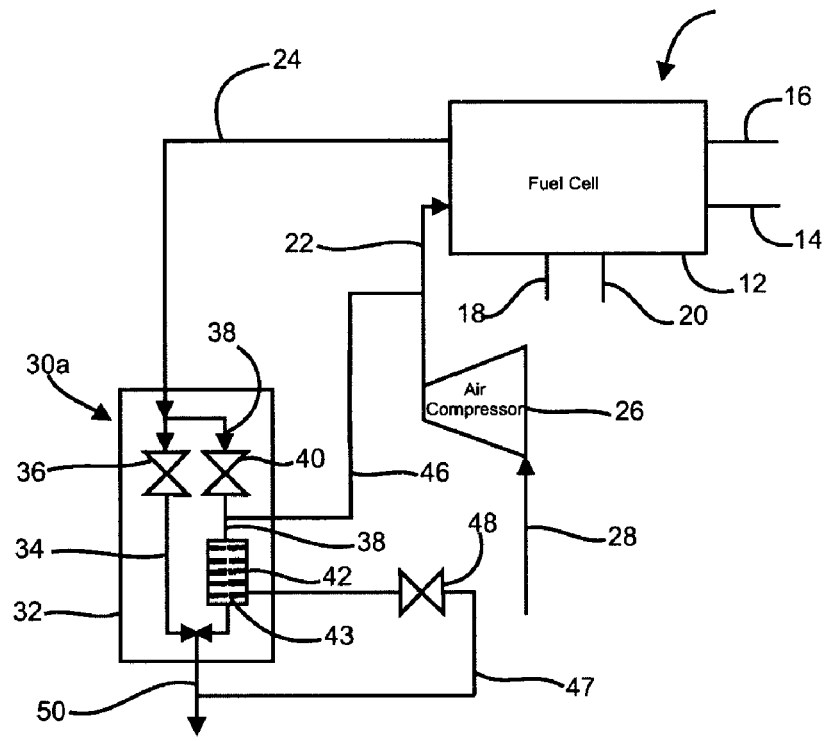
FIG. 2B is a schematic of the system of FIG. 2A, illustrating operation of the water-retaining system under warm ambient temperatures according to one embodiment of the invention.
Figure 2C:
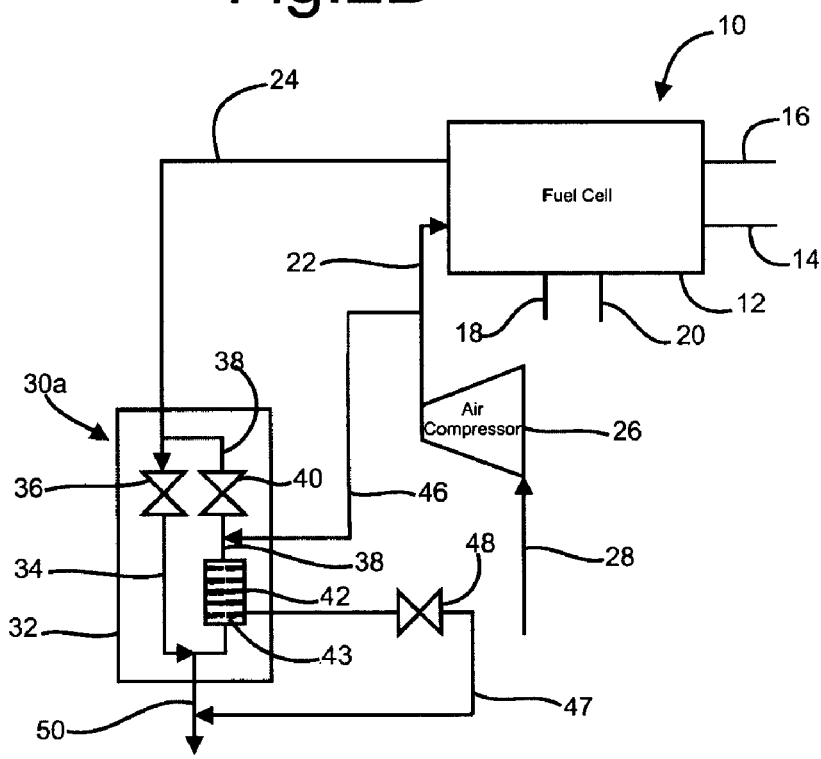
FIG. 2C is a schematic of the system of FIG. 2A, illustrating regeneration of the water-retaining material according to one embodiment of the invention.

Referring next to FIGS. 2A-2C, in another embodiment of the invention, the water-retaining system is generally indicated by reference numeral 30a. The absorber system 30a is generally the same in design as the water-retaining system 30, which was heretofore described with respect to FIGS. 1A-1C, except a regeneration outlet conduit 47 connects the housing 42 to the discharge conduit 50. The regeneration valve 48 is provided in the regeneration outlet conduit 47, in the downstream direction of air flow from the housing 42, instead of in the regeneration inlet conduit 46, as was the case with respect to the water-retaining system 30.

Figure 3:
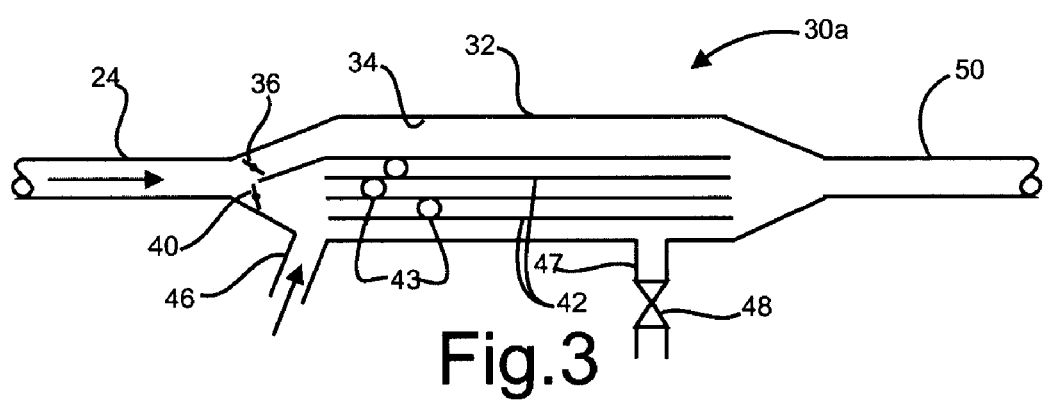
FIG. 3 is a schematic of a parallel conduit embodiment of a water-retaining system according to one embodiment of the invention.
Figure 7:
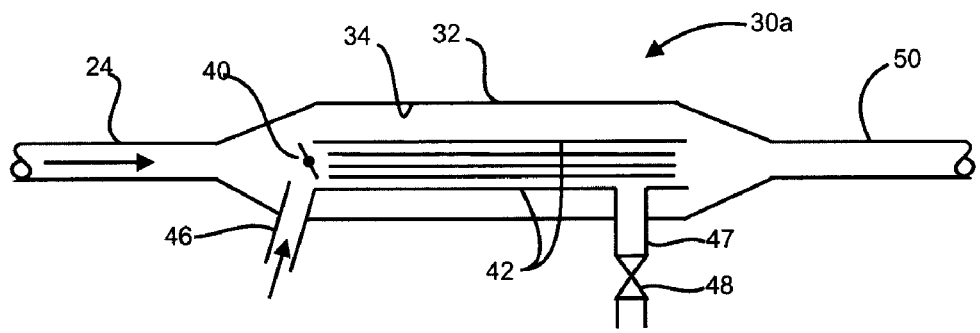
FIG. 7 is a schematic of a coaxial conduit including a first conduit extending through the center of a bypass conduit according to one embodiment of the invention.
Figure 8:
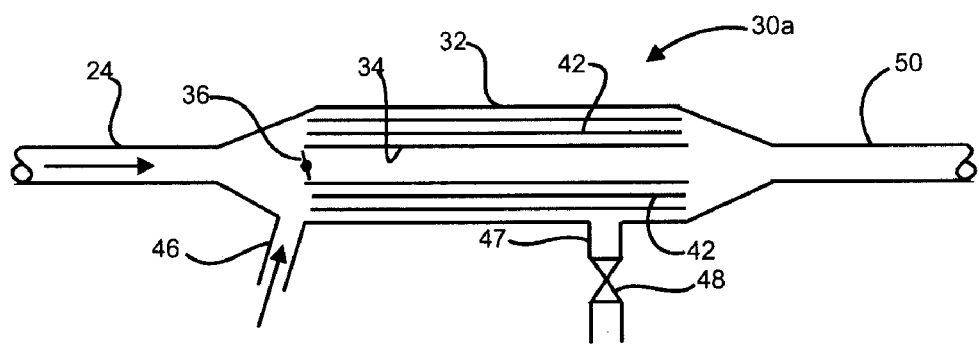
FIG. 8 is a schematic of a coaxial conduit including a bypass conduit extending through a first conduit according to one embodiment of the invention.

Referring now to FIGS. 3, 7 and 8, the water-retaining system 30a according to various embodiments of the invention may have any of various configurations. In the parallel conduit embodiment shown in FIG. 3, the water-retaining system 30a includes an elongated housing 32 which is connected to the cathode outlet 24 at the upstream end of air flow through the elongated housing 32 and to the discharge conduit 50 at the downstream end of air flow through the elongated housing 32. Housings 42 are adjacent and parallel to each other and to the bypass conduit 34 in the elongated housing 32. The water-retaining material 43 is provided in the housings 42 in the form of absorbent or adsorbent material or in the form of an absorbent or adsorbent material on the interior surfaces of the housing 42. The valves 36, 40 (shown as flaps in FIG. 3) are located at the inlet ends of the bypass conduit 34 and pair of housings 42, respectively. The configurations of the water-retaining system 30a shown in FIGS. 3, 7 and 8 are also generally applicable to the water-retaining system 30 heretofore described with respect to FIGS. 1A-1C.

In the embodiment shown in FIG. 7, the water-retaining system 30a has a coaxial configuration in which the housing 42 is inside and concentric with the bypass conduit 34. The valve 40 controls flow of exhaust through the housing 42, whereas flow of exhaust through the bypass conduit 34 is unregulated. Therefore, during regeneration, the housing 42 is heated by the exhaust flowing through the surrounding bypass conduit 34. In the embodiment shown in FIG. 8, the water-retaining system 30a has a coaxial configuration wherein the bypass conduit 34 is inside and concentric with the absorber conduit 42. The valve 36 controls flow of exhaust through the bypass conduit 34, whereas flow of exhaust through the housing 42 is unregulated.

In one embodiment of the invention, the operation of the water-retaining system 30a under start-up and/or cold ambient temperature conditions is shown in FIG. 2A and is substantially the same as that which was heretofore described with respect to the water-retaining system 30 in FIG. 1A. Likewise, operation of the water-retaining system 30a under non-startup conditions and warm ambient temperature conditions is shown in FIG. 2B and is substantially the same as that which was heretofore described with respect to the water-retaining system 30 in FIG. 1B.

FIG. 2C illustrates operation of the water-retaining system 30a during regeneration of the water-retaining material 43. Accordingly, the valve 36 is opened whereas the valve 40 is closed. Consequently, substantially all of the exhaust from the cathode outlet 24 flows through the bypass conduit 34 and is prevented from flowing through the first conduit 38 and housing 42, respectively. Simultaneously, the regeneration valve 48 in the regeneration outlet conduit 47 is opened. Thus, hot and/or dry air flows from the cathode inlet 22 and through the regeneration inlet conduit 46, the first conduit 38 and the housing 42, respectively. In the housing 42, the dry air removes moisture from the water-retaining material 43 and is then discharged from the housing 42, through the regeneration outlet conduit 47 and into the discharge conduit 50, which discharges the air with the exhaust from the bypass conduit 34 to the atmosphere. Accordingly, the water-retaining material 43 in the housing 42 is primed for continued use. In one embodiment, the housing 42 may be a separate container, and in another embodiment, the housing 42 may be part of the conduit or pipe use for exhausting cathode gas from the fuel cell 12.

While the exemplary embodiments of the invention have been described above, it will be recognized and understood that various modifications can be made in the invention and the appended claims are intended to cover all such modifications which may fall within the spirit and scope of the invention.

What is claimed is:

1. A product comprising:
   a fuel cell stack comprising a cathode outlet;
   a first conduit connected to the cathode outlet and to a water-retaining material housing;
   a water-retaining material provided in said water-retaining material housing;
   a bypass conduit connected to the cathode outlet, the bypass conduit and the first conduit being coaxial and concentric of the fuel cell system; and
   a first valve for opening and closing at least one of said first conduit and said bypass conduit.

2. The product as set forth in claim 1 further comprising a discharge conduit connected to said water-retaining material housing and said bypass conduit.

3. The product as set forth in claim 1 wherein said first valve is provided in communication with said first conduit and further comprising a second valve provided in communication with said bypass conduit.

4. The product as set forth in claim 1 wherein said first conduit extends through said bypass conduit and said first valve is provided in communication with said first conduit.

5. The product as set forth in claim 1 wherein said bypass conduit extends through said first conduit and said valve is provided in communication with said bypass conduit.

6. The product as set forth in claim 1 wherein said water-retaining material comprises an absorbent material.

7. The product as set forth in claim 1 wherein said water-retaining material comprises an adsorbent material.

8. A product comprising:
   a fuel cell stack that includes a cathode inlet and a cathode outlet, said cathode inlet being connected to said fuel cell stack for distributing a cathode gas to said fuel cell stack, said cathode outlet being connected to said fuel cell stack for delivering a cathode exhaust from said fuel cell stack;
   a first conduit connected to said cathode outlet;
   a water-retaining material provided in said first conduit;
   a bypass conduit connected to said cathode outlet;
   a first valve for opening and closing at least one of said first conduit and said bypass conduit; and
   a regeneration inlet conduit provided in communication with said cathode inlet and said first conduit to divert a portion of said cathode gas around said fuel cell stack and to said water-retaining material to remove moisture from said water-retaining material.

9. The fuel cell system as set forth in claim 8 further comprising a regeneration valve provided in said regeneration inlet conduit.

10. The fuel cell system as set forth in claim 8 further comprising a regeneration outlet conduit provided in communication with said first conduit and a regeneration valve provided in said regeneration outlet conduit.

11. The fuel cell system as set forth in claim 8 further comprising a discharge conduit provided in communication with said first conduit and said bypass conduit.

12. The fuel cell system as set forth in claim 11 further comprising a regeneration outlet conduit provided in communication with said first conduit and said discharge conduit and a regeneration valve provided in said regeneration outlet conduit.

13. The fuel cell system as set forth in claim 11 further comprising a regeneration valve provided in said regeneration inlet conduit.

14. The fuel cell system as set forth in claim 8 wherein said first valve is provided in communication with said first conduit and further comprising a second valve provided in communication with said bypass conduit.

15. The fuel cell system as set forth in claim 8 wherein said first conduit and said bypass conduit are disposed in generally parallel relationship to each other.

16. The fuel cell system as set forth in claim 8 wherein said first conduit and said bypass conduit are coaxial and concentric.

17. The fuel cell system as set forth in claim 8 wherein said first conduit extends through said bypass conduit and said valve is provided in communication with said first conduit.

18. The fuel cell system as set forth in claim 8 wherein said bypass conduit extends through said first conduit and said valve is provided in communication with said bypass conduit.

19. A fuel cell system comprising:
   a fuel cell stack that includes a cathode inlet and a cathode outlet, said cathode inlet being connected to said fuel cell stack for distributing a cathode gas to said fuel cell stack, said cathode outlet being connected to said fuel cell stack for delivering a cathode exhaust from said fuel cell stack;

a first conduit connected to said cathode exhaust outlet;

a water-retaining material housing provided in said first conduit, said water-retaining material housing having a water-retaining material therein that removes moisture from said cathode exhaust that flows through said first conduit;

a bypass conduit connected to said cathode exhaust outlet;

a regeneration inlet conduit connected to said cathode inlet conduit and said first conduit upstream of said water-retaining material housing to deliver said cathode gas from said cathode inlet conduit to said water-retaining material to remove moisture from said water-retaining material; and a discharge conduit connected to said first conduit and said bypass conduit that converges said first conduit and said bypass conduit downstream from said water-retaining material housing.

20. The fuel cell system as set forth in claim 19 further comprising a regeneration valve provided in said regeneration inlet conduit.

* * * * *